July 13, 1965  R. N. BROWN ETAL  3,195,141

MULTIPLE-POINT RECORDERS

Filed May 6, 1963

United States Patent Office 3,195,141
Patented July 13, 1965

3,195,141
MULTIPLE-POINT RECORDERS
Robert N. Brown, Lansdale, Curtis R. A. Johnson, Flourtown, and Albert E. Paschkis, Gwynedd Valley, Pa., assignors to Leeds and Northrup Company, Philadelphia, Pa., a corporation of Pennsylvania
Filed May 6, 1963, Ser. No. 277,995
20 Claims. (Cl. 346—61)

This invention relates to multi-point recorders for recording, as a function of time, the variations in magnitude of a variable, such as temperature, pressure, voltage or the like, at various points of a system or process.

As in prior arrangements, the recorder has a carriage which, for each point as sequentially connected to a measuring circuit, is moved transversely of a chart to a momentary rest position corresponding with the magnitude of the measured variable at that point.

In accordance with the present invention, a print wheel movable with the carriage has sets of markers equally angularly spaced about its periphery; each set comprising a dot marker and at least one point-identification marker. The print wheel is mounted for rotation about its axis sequentially to present the sets of markers to the chart, for pivotal movement about a second axis periodically to effect engagement with the chart, and for pivotal movement about a third axis to change the angle between the axis of rotation of the print wheel and the chart selectively to print a dot only or a dot plus point-identification. By providing a print wheel with two peripheral rows of point-identification markers, one on either side of the row of dot markers, the number of points identified may be double the number of marker sets.

More particularly in accordance with the present invention, the pivotal or tilting movement of the print wheel with respect to the aforesaid third axis may be so timed that the record of each point variable consists of a series of dots periodically accompanied by a point-identification character. Additionally or alternatively, the angular position of the axis of rotation of the print wheel with respect to the third axis may be selectively preset so that the record of each point consists of dots only or of dots each accompanied by a point-identification character.

More specifically, the print wheel is rotatably mounted on a print arm which is pivotally mounted on a frame which in turn is pivotally mounted on the reciprocable carriage. The axis of rotation of the print wheel is parallel to the pivotal axis of the print arm: the pivotal axis of the frame is at right angles to the pivotal axis of the print arm and passes through the point of engagement of the dot markers with the chart.

Further in accordance with the invention, the print arm is normally held in a neutral position for which the print wheel is away from the chart by a pair of centering arms and spring means biasing them to a stop-limited position. A cam periodically engaging the print arm moves it and one of the arms from neutral position in direction away from the chart to store energy in the biasing means. The stored energy impels the print arm, when released from the cam, to move in reverse direction for engagement of the print wheel with the chart. During the over-travel beyond neutral position, the print arm engages and moves the other centering arm again to store energy in the biasing means, this time for providing return of the print arm to neutral position.

Further in accordance with one embodiment of the invention, the print wheel is rotated about its axis by a gear train including gears carried by the print arm and providing a differential-gear action so phased that it is opposite to the gear drive during movement of the print arm toward the chart. Such differential gear action, together with back-lash designed into the gear train, provides a printing interval during which the print wheel is not rotating. In another embodiment of the invention, the aforesaid centering arms also serve as pawls cooperating with a ratchet wheel coupled to the print wheel to advance it step-by-step for successive printing cycles.

The invention further resides in new and useful features of construction, combination and arrangement hereinafter described and claimed.

For a more detailed understanding of the invention, reference is made to the following description and to the attached drawings in which.

Figure 1:
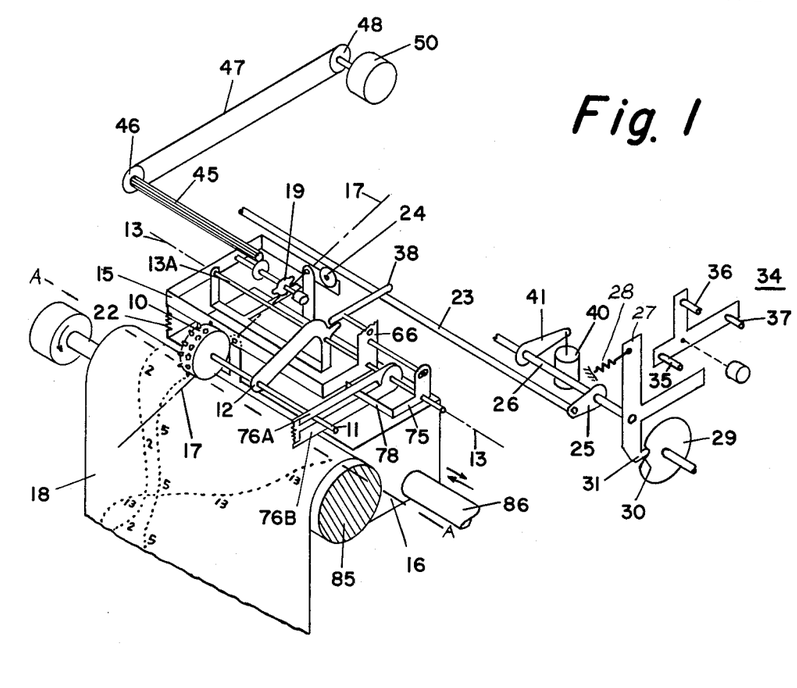
FIG. 1 is a perspective view schematically illustrating a print-wheel mounting arrangement and actuating mechanism providing for the different types of printing operation.
Figure 2:
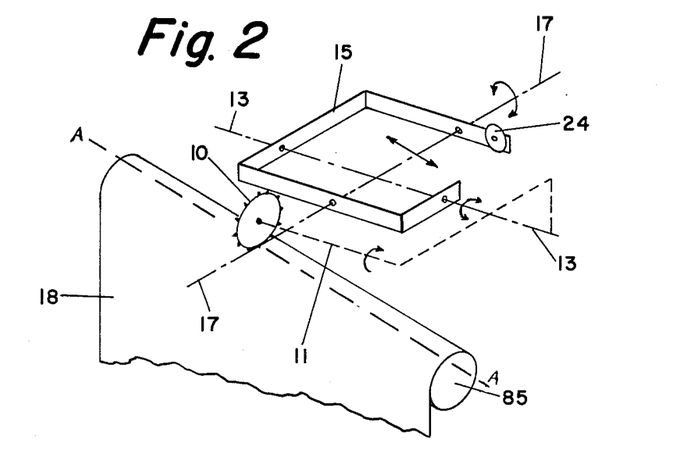
FIG. 2 is an explanatory figure referred to in discussion of the geometric relationsihp between various axes identified in FIG. 1.

Referring to FIGS. 1 and 2, the print wheel 10 is mounted on the reciprocable recorder-carriage 16 for movement about the pivotal axis 13 toward and from the recorder chart 18. Specifically, the print wheel 10 is carried by the print arm 12 with the axis of rotation 11 of the print wheel parallel to the pivotal axis 13 of the arm. The print wheel 10 is periodically swung bodily about the printing axis 13, as by the continuously rotating cam 19, for engagement with the chart 18 along the print line A—A.

Figure 4:
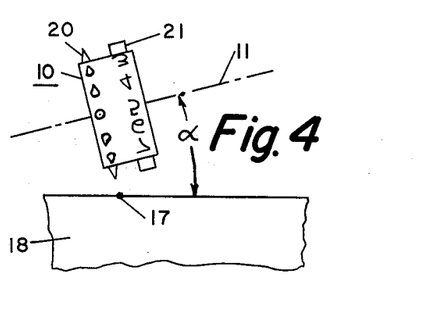

The peripherel face of the print wheel 10 (FIG. 4) is provided with equally angularly-spaced sets of markers, each set comprising a dot-marker 20 and a point-identification marker 21. With the peripheral face of the print wheel inclined at an angle to the chart, only a dot is printed when the print arm is rotated about axis 13 to the position shown in FIG. 5: with the peripheral face of the print wheel parallel to the chart (FIGS. 6, 7), a dot plus a point-identification character is printed when the print arm is rotated about axis 13.

Selectively to provide either type of printing, the axle 13A of the print arm is supported by the yoke or frame 15 which in turn is mounted on carriage 16 for pivotal movement about the tilt axis 17 which is at right angles to the printing axis 13. The frame 15 is biased, as by spring 22, into engagement with the tilt-bar 23 which extends parallel to the path of travel of carriage 16. Preferably, such engagement is through an anti-friction roller 24 on the yoke 15.

Figure 5:
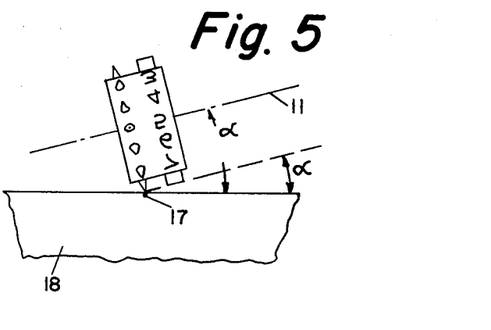
Figure 6:
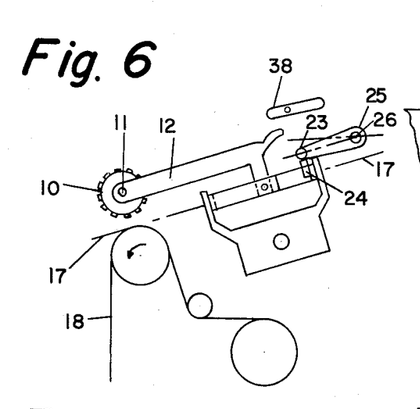
Figure 7:
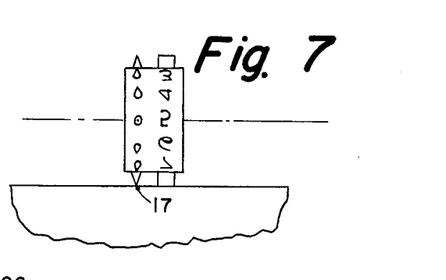

The bar 23 is attached, as by arms 25, to the tilt shaft 26 for movement to different angular positions determining the angular position of the print wheel axis with respect to the print line A—A in a plane parallel to the path of carriage travel. The shaft 26 is supported at its ends by side frame members not shown. In the particular arrangement shown in FIG. 1, the arm 27 attached to the tilt-bar shaft, is biased by spring 28 against the notched disc-cam 29. With the cam-follower 31 of arm 27 engaging the periphery of the cam, the tilt-bar is in the angular position shown in FIG. 3 for which only the dot markers 20 are presented to the chart 18 (FIGS. 3, 4) for printing when the print wheel is rocked about axis 13 to engage the chart (FIG. 5). With the cam-follower 31 in the notch 30 of cam 29, the tilt-bar 23 is in the second angular position shown in FIG. 6 for which both markers 20, 21 of a set are presented to the chart 18 for printing when the print wheel is rocked about axis 13 to engage the chart (FIGS. 6, 7).

Figure 8:
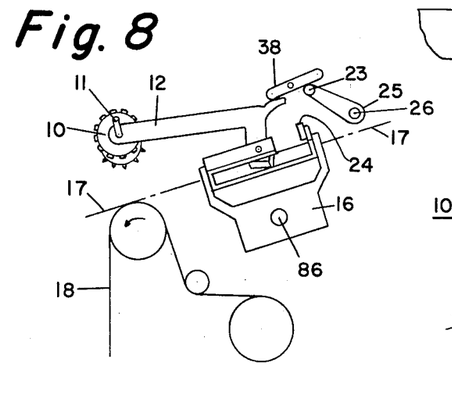
FIG. 8 is a detail figure referred to in discussion of a print-holdout arrangement.
Figures 12, 13:
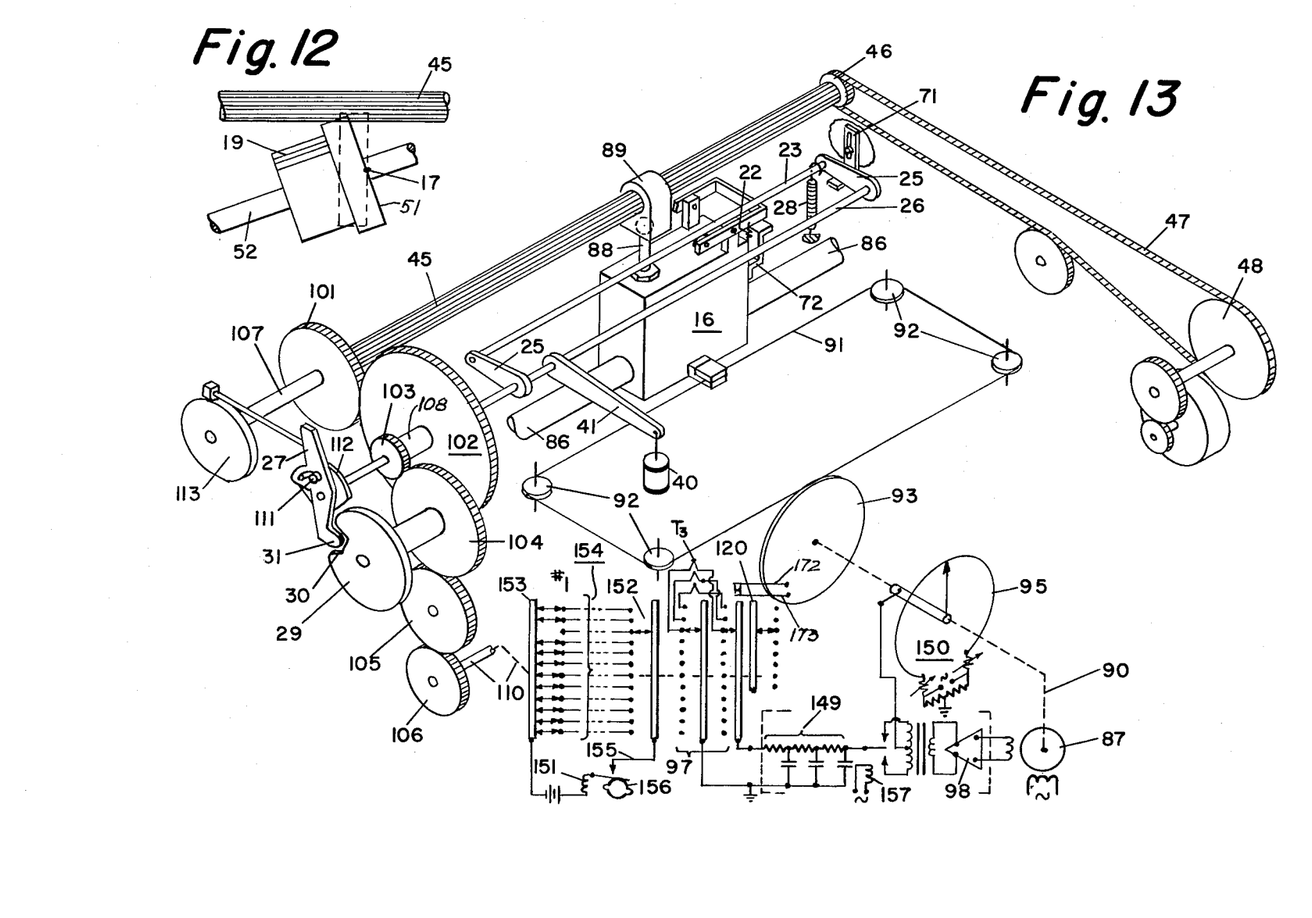
FIG. 12 is a detail view of the gear and cam drive shown in FIGS. 1 and 10.
FIG. 13 schematically and in perspective illustrates the multi-point recorder mechanism of previous figures with associated measuring circuitry and timing means.

As later explained in discussion of FIG. 13, the selector cam 29 may be driven in synchronism with rotation of the print wheel about its axis 11 so that each of the different point-identification markers 21 (numbered 1 to 12 for example) is in turn printed each after printing a series of dots. Again, the cam 29 serves as a selector for the type of printed record to be produced. With cam 29 omitted or immobilized with its notch 30 opposite the cam-follower 31, the tilt-bar 23 may be continuously maintained in its first angular position (FIG. 3) for printing of dots only, or in its second angular position (FIG. 6) for printing of a point-identification numeral or character for every printed dot. For such purpose, the recorder may be provided with a selector 34. For the #1 position of selector 34 (FIG. 1), the pin 35 is engaged by arm 27 to position the tilt-bar 23 as in FIG. 6 for printing of dots plus point-identification; and for the #2 position of selector 34, the pin 36 is engaged by arm 27 to position the tilt-bar 23 as in FIG. 3 for printing of dots only. (The preferred arrangement for selecting the foregoing modes of printing is shown in FIG. 13 and later discussed). For the #3 position of selector 34, the pin 37 is engaged by arm 27 to position the tilt-bar 23 as in FIG. 8. As the tilt-bar is moved to the #3 position, it engages and swings the pawl 38 which is pivotally mounted on frame 15. In consequence, the print arm 12 is rocked in clockwise direction about its axis 13 to the print-holdout position shown in FIG. 8 for which the tail extension 61 of the print arm (FIGS. 1 and 10) is out of the path of the print cam 19.

With the selector 34 omitted or turned to Off position, the tilt-bar 23 may be moved to the print-holdout position by energization of solenoid 40 whose plunger or armature is mechanically coupled as by arm 41 (FIGS. 1, 13, 14) to the actuating shaft 26 of the tilt-bar. The print-holdout position is provided for various purposes including those later herein described in connection with FIG. 14.

Figure 9:
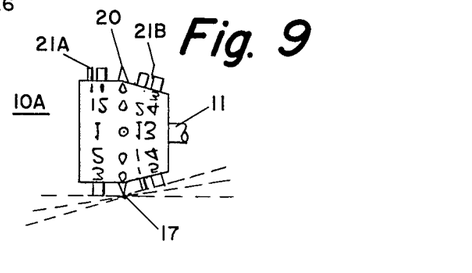
FIG. 9 is illustrative of a modified form of print wheel.

Referring to FIG. 9, the print wheel 10A has two peripheral rows of identification markers 21A, 21B, one row on each side of the row of dot markers 20. With the axis of shaft 11 parallel to the printing line A—A, the point-identification markers 21A (numbered for example from #1 to #12), are successively presented to the chart for printing concurrently with the associated dot. With the axis of shaft 11 inclined to bring the peripheral face having thereon the point-identification characters 21B (numbered for example from #13 to #24) parallel to the printing line, the characters of this row are successively presented to the chart for printing concurrently with the associated dot. For the intermediate angle of inclination of shaft 11, only the dot markers 20 are presented to the chart for printing. It is to be understood that as in FIG. 1 the print wheel 10A is carried by an arm 12 or equivalent for pivotal movement about axis 13 with respect to carriage 16 and that the angle between the axis 11 of the print wheel with respect to the print line is determined by the angular position of frame 15 about its axis 17. As in FIG. 2, the axis 17 as extended passes through the print line A—A at the point of engagement by the dot marker.

In FIG. 1, the mechanism for rotating the print wheel about its axis has been in part omitted for clarity of illustration. Now referring to FIGS. 1 and 10, the elongated pinion 45 extending between the side frames parallel to the path of travel of carriage 16 is continuously rotated as through sprocket 46, chain 47 and sprocket 48 from a small clock motor 50. The pinion 45 is continuously in sliding mesh with gear 51 on shaft 52 which is supported by the tilt frame 15 on the carriage 16. The gear 51 is coupled to or integral with gear 53 which drives gear 54 on the sleeve 55 which is free to rotate on shaft 13A. The gear 56 also attached to sleeve 55 thus rotates about the pivotal axis 13—13 of the print arm 12. The gear 57 coupled, as by key 58 to the print wheel 10, is driven from gear 56 by the gears 59, 60 which are carried by the print arm 12.

Figure 10:
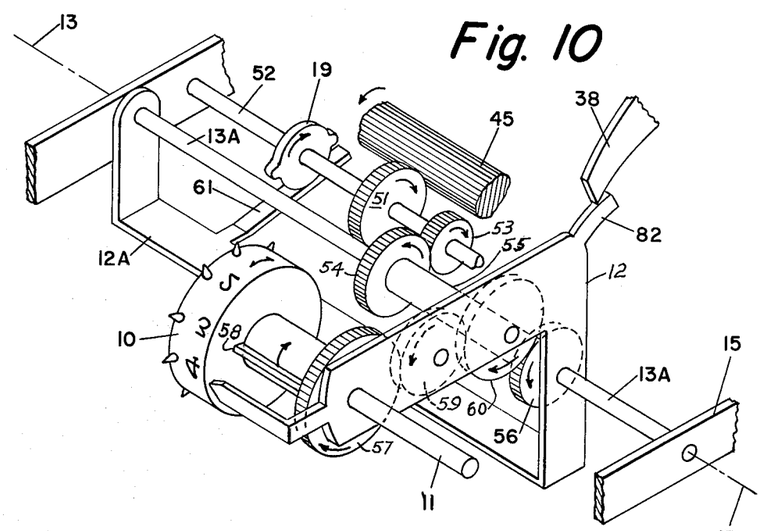
FIG. 10 in perspective schematically shows a gear-train arrangement for advancing the print wheel of FIG. 1.

The rotation of the print wheel 10 about its axis 11 is so timed with respect to its periodic movement about the printing axis 13 that the latter occurs as the successive sets of markers in turn arrive opposite the chart. In the particular arrangement shown, the cam 19 is of two-lobe construction and is directly coupled to or integrally formed with gear 51. The gearing from gear 51 to the print wheel is such that the print wheel is advanced, for the 12-point recorder under discussion, thirty degrees about its axis in the interval between successive rocking motions imparted to the print arm 12, via its extension 61, by the cam lobes.

When the arm 12 is rocked about axis 13 during a printing cycle, there is a differential gear action between the gear 56 and the gears 57–60 which are swung with arm 12 about the relatively fixed axis of gear 56. For one direction of pivotal movement of arm 12, this differential gear action imparts to the print wheel an angular displacement and velocity additive to that imparted by the gear-train drive: for the opposite direction of pivotal movement of arm 12, the angular displacement and velocity, due to the differential action, are subtractive from that due to the gear drive. The angular displacement due to the differential action is returned to zero when the print arm is returned to its original position. The differential gear action is here so phased by selection of the number of gears mounted on arm 12 that the subtraction of velocities occurs for movement of the print wheel toward the chart so to minimize or eliminate blurring of the printing. It is very difficult, as a practical matter, so to relate the velocity component due to the differential action to the opposite velocity component due to the gear drive that the net velocity is zero at the instant of contact between the chart and the print wheel.

To insure that the print wheel is not rotating at such instant, the gear train is made with sufficient back-lash temporarily to interrupt the gear drive of the print wheel as arm 12 is released from cam 19 for movement of the print wheel toward the chart. The gear drive is resumed after printing, when the back-lash is taken up by continued rotation of the driving gear for the train. During the interval for which the gear drive is so interrupted the print wheel is retained in angular position by frictional engagement with an axial thrust bearing against which it is biased by a spring not shown.

Figure 11:
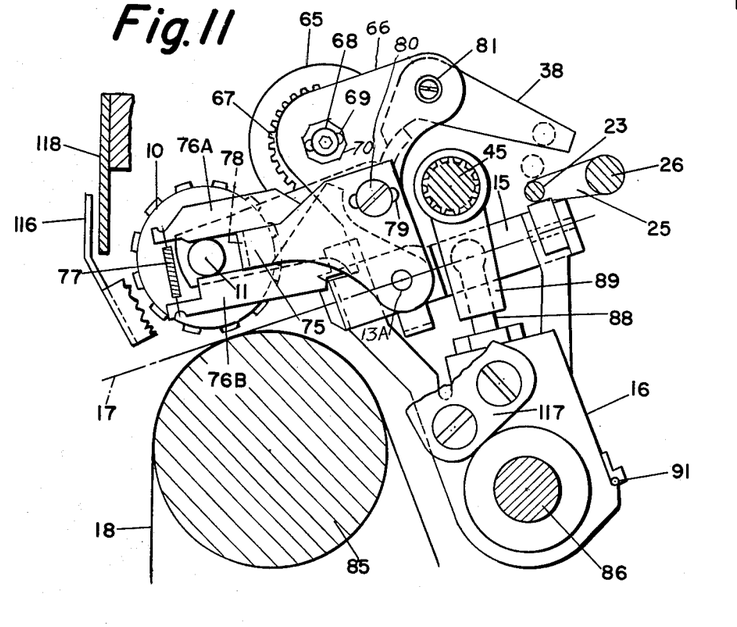
FIG. 11 is a side elevational view of the carriage assembly schematically illustrated in preceding figures.

When the print wheel is not of the ink-impregnated type, as it may be in FIG. 1, the upward motion of the print arm 12 from its normal or neutral position is utilized for effecting periodic engagement of the sets of markers with the inking wheel 65 (FIG. 11). As there shown, the tilt frame or yoke 15 has a vertically extending arm 66 which supports the inking wheel 65 for rotation about an axis parallel to axle 13A. The inking wheel 65 is coupled to gear 67 and rotates with it on the stud shaft 68 extending from bracket 66. The gear 67 is in mesh with one of the gears carried by print arm 12 and so is driven in synchronism with the print wheel 10. The slot 69 in bracket 66 permits adjustment of the position of shaft 68 of the inking wheel for sufficient inking pressure. The clamping nut 70 holds the shaft in the adjusted position.

For single color printing, the wheel 67 may be simply a roll impregnated with ink; for multi-color printing, it may be of metal with radial sectors each filled with a pad of corresponding shape and saturated with ink of color assigned to identify the corresponding measuring point. The different types of inking wheels are interchangeably mounted on shaft 69.

As best shown in FIG. 11, the print arm 12 is biased to a neutral position for which the print wheel 10 is out of contact with the chart 18 by an arrangement comprising the stop plate 75 adjustably fastened to the bracket extension 66 of frame 15, the scissors arms 76A, 76B individually free to rotate on shaft 13A, and a biasing spring 77 interconnecting the free ends of the scissors arms. The arms 76A, 76B as biased toward each other, as by the spring 77, normally respectively engage the upper and lower faces of the stop 78 formed by the inturned free end of plate 75. The print wheel shaft 11, or equivalent stop on arm 12 extends between the scissors arms 76A, 76B so that the normal angular position of the print arm about axis 13 corresponds with that of the stop piece 78. The slot 79 in the stop plate 75 permits a nice adjustment of such neutral position of the print arm 12. The clamping screw 80 provides for maintenance of such adjustment.

When the print arm 12 is swung upwardly by engagement of its tail extension 61 (FIGS. 1 and 10) with a lobe of cam 19, the print wheel shaft 11 lifts the upper scissors arms 76A from stop 78 and so stores energy in the biasing spring 77. When cam 19 releases the print arm, the stored energy of the spring impels the print wheel 10 back to the neutral position for which the upper scissors arm 76A reengages stop 78. However, the print wheel 10, because of its inertia, overtravels the neutral position for momentary printing contact with the chart 18. During this overtravel, the shaft 11 of the print wheel moves the lower scissors arm 76B downwardly from engagement with stop 78 to store energy in spring 77 to insure return of arm 12 and the parts mounted thereon to neutral position after printing.

FIGS. 10 and 11 also show in somewhat greater detail the mounting and construction of the print-holdout pawl 38. Specifically the upper portion of the pawl is U-shaped to provide spaced bearings for the stud shaft 81 extending from the vertical extension or arm 66 of the pivoted frame 15. The lower portion of pawl 38 extends adjacent to the tail member 82 of arm 12. When the tilt-bar 23 is to the print-holdout position, the pawl 38 is moved in counterclockwise direction from the position shown in FIG. 11 to the position shown in FIG. 8 for which the extension 61 of arm 12 is out of the path of the print cam 19.

The carriage 16 is guided for travel parallel to the axis of the chart roll 85 by the rod 86 (FIGS. 11 and 13) which extends between side frame members not shown. To minimize the load upon the rebalancing motor 87, instead of using a spline or key to maintain the carriage 16 in proper plane, the upper face of the carriage is provided with an upwardly extending stud 88 which slidably and rotatably receives a bearing member 89 of nylon or similar low-friction material. The elongated pinion 45 passes through this bearing and so serves as a second track or guide bar maintaining the carriage 16 in a fixed plane during its travel transversely of the recorder chart.

With the carriage so slidably mounted, the gear 51 carried by the tiltable yoke 15 is maintained in mesh with the pinion 45 (FIGS. 10 and 12) for continuous drive to the print wheel. The gear 51 is so positioned on its shaft 52 in relation to the tilt axis 17 of yoke 15 that the gear 51 remains in mesh with pinion 45 whether the yoke 15 be positioned for printing of dots only or for printing of dots and point-identification.

Referring now to FIG. 13, the print wheel carriage 16 is coupled to the slidewire shaft 90 by a conventional drive including the cord 91, guide pulleys 92 and drum 93. As the slidewire 95 is adjusted by motor 87 to rebalance the measuring network, the carriage 16 is moved to a rest position transversely of chart 18 which corresponds with the magnitude of the variable then being measured at a selected point.

Assuming by way of example that the recorder is to be used for recording the temperature at twelve measuring points in a system or process, the corresponding temperature-responsive devices, for example $T_1$-$T_{12}$, can be sequentially connected in the measuring circuit by a 12-point selector switch 97 suitably synchronized with the print wheel 10. As each thermocouple in turn is connected by switch 97 in circuit with the potentiometer slidewire 95, the difference of the opposed voltages respectively produced by the thermocouple and slidewire as appearing in the input circuit of amplifier 98 causes energization of motor 87 in sense to effect a balancing adjustment of slidewire 95. This balancing at each measuring point is effected within a brief interval, for example, one second, so that the carriage 16 is normally at rest for printing of a dot, or a dot plus the point-identification, before the selector switch 97 connects the thermocouple of the next point in circuit with the slidewire.

In the preferred arrangement shown in FIG. 13, the point-selector switch 97 is formed by two decks or wafers of a conventional stepping-relay whose coil 151 is in circuit with a third deck 152 of the stepping relay and a synchronizing switch 153 driven as later described from the recorder mechanism.

All of the fixed contacts of switch 153 are respectively connected by a multi-conductor cable 154 to the corresponding fixed contacts of switch 152. The movable contacts of the synchronizing switch 153 are one less in number than the fixed contacts so that its open point, corresponding with the point to be measured, continuously progresses around the wafer during continued operation of the recorder. The associated third wafer switch 152 of the stepping relay has a single movable contact.

The motor coil 151 of the stepping relay is in series with the synchronizing switch 153, the deck 152 of the stepping relay and with the timing switch 155 of the stepping relay which is opened by cam 156 when coil 151 is energized. With switch 155 closed, for any position of the synchronizing switch 153, there is only one position of switch 152 of the stepping relay for which the motor coil 151 is permanently deenergized. Assuming, for example, that switch 153 is in position for recording of the temperature at point #3 and switch 155 has closed, all energizing circuits for the relay coil 151 are complete except the one comprising the #3 conductor of cable 154 and the correspondingly numbered fixed contacts of switches 152, 153. Thus, the relay will advance the movable contact of the switch 152 until the open circuit corresponding with measuring point #3 is located; it being understood that the movable contacts of the selector switch 97 are correspondingly advanced for engagement with the #3 contacts of that switch so to connect transducer #3 into the measuring circuit. This same self-synchronizing action occurs prior to the successive printing interval for each of the other points.

The circuitry for measuring the output of the selected transducer including the filter 149, synchronous switch 157, potentiometer circuit 150, may be similar to that disclosed for example in Vandeventer Patent 2,808,549 and need not be further described.

In the synchronizing arrangement shown in FIG. 13, the movable contact of the synchronizing switch is driven through the gear train 101–106 from the pinion 45 which, as previously noted, also drives the print wheel 10. The gear 101 is attached to the pinion shaft 107 and is in mesh with gear 102 which together with gear 103 is attached to a sleeve 108 rotatably supported on the tilt shaft 26. The gear 103 is in mesh with gear 104 attached to shaft 109 of the print-selector cam 29. The gear 105 is in mesh with gear 104 and also with gear 106 which is attached to shaft 110 of the synchronizing switch 153. The speed ratio of the whole gear train is such that one revolution of switch shaft 110 occurs for one revolution of the print wheel and the phasing is such that the movable contact of switch 97 passes from a first point to a second point immediately after printing of the first-point measurement.

The ratio of the gears 101–104 is such that one revolution of cam 29 corresponds with N revolutions of print wheel 10 plus or minus an angle corresponding with M times the angular spacing between successive point-identification markers (N may be any small integer and M may be any prime number). Specifically, with a ratio of 1:25, the cam 29 makes one revolution for each 750 degrees of movement of print wheel 10, i.e., the periodic or angular relation between the print wheel 10 and cam 29 may be expressed as $$N360° + M\frac{360°}{12}$$

where $N=2$ and $M=1$. The cam 29 is so phased that its notch 30 is opposite the cam-follower 31 of arm 27 when a set of markers on the print wheel is in position for printing. The cam 113 attached to the pinion shaft 107 is provided primarily to rock the cam-follower 31 nearly out of the notch 30 of cam 29 upon completion of a dual printing operation. The cam 29 completes the lift-out and restores the tilt-bar 23 to the dot-printing position after each printing of a dot plus point-identification. Additionally, the cam 113 is so shaped that it controls the rate at which the cam-follower drops into the notch 30 in avoidance of jarring the printing mechanism on carriage 16. The stop 71 fastened to a side frame of the recorder is so adjusted that the cam-follower portion of arm 27 does not bottom in the notch 30 of the print cam 29 during the periodic dual-printing operation.

To adapt the recorder for dual-printing on every printing operation, the clamping screw 111 of arm 27 is loosened and arm 27, as provided by the adjusting slot, is swung about shaft 26 to a position for which its cam-follower 31 is clear of the periphery of cam 29. The arm 27 is then clamped to plate 112 in its new position by retightening screw 111. The angular position of the tiltable printing frame 15 as determined by stop 71 thus continuously corresponds with FIG. 6.

Figure 3:
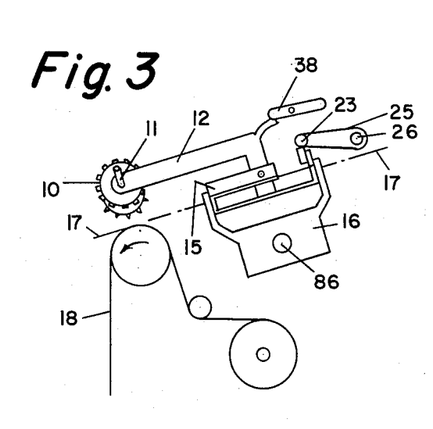
FIGS. 3 to 7 are detailed figures referred to in explanation of the different types of printing operation.

To adapt the recorder for printing of dots only, the stop 71 (FIG. 13) is raised so that the angular position of the printing frame 15 continuously corresponds with FIG. 3. The extent to which frame 15 is tilted by its biasing spring 22 to the dot-printing position is limited by the stop 72 attached to the recorder carriage 16.

With associated circutry, the print-holdout solenoid 40 (FIGS. 1, 13, 14) may be used for various purposes including (a) To suspend the printing action for continued operation of the recorder as an indicating instrument;

(b) To print on demand only selected points, i.e., those in use or of interest; and (c) To suspend or commence printing and give an alarm if the measured variable exceeds the aforesaid high or low limits on any point.

For the (a) type of operation, the switch 115 (FIG. 14) is closed for continuous energization of solenoid 40 from a current source exemplified by battery 114. With the solenoid energized, the tilt-bar 23 is set in the position shown in FIG. 8 so that the print cam 19 is effectively disabled as previously explained. With the recorder continuing in operation, the point-selector switch 97 in turn connects the transducers into the measuring circuit and the carriage 16 is repeatedly moved to positions each representing the temperature or other condition at each point. The index or pointer 116 (FIG. 11) attached to the carriage 16 via plate 117 continues to cooperate with the recorder scale 118 to show the magnitude of the measured variable at each point. This type of operation of the recorder may be used, for example, in maintenance or in checking of the measuring circuit components and connections.

Figure 14:
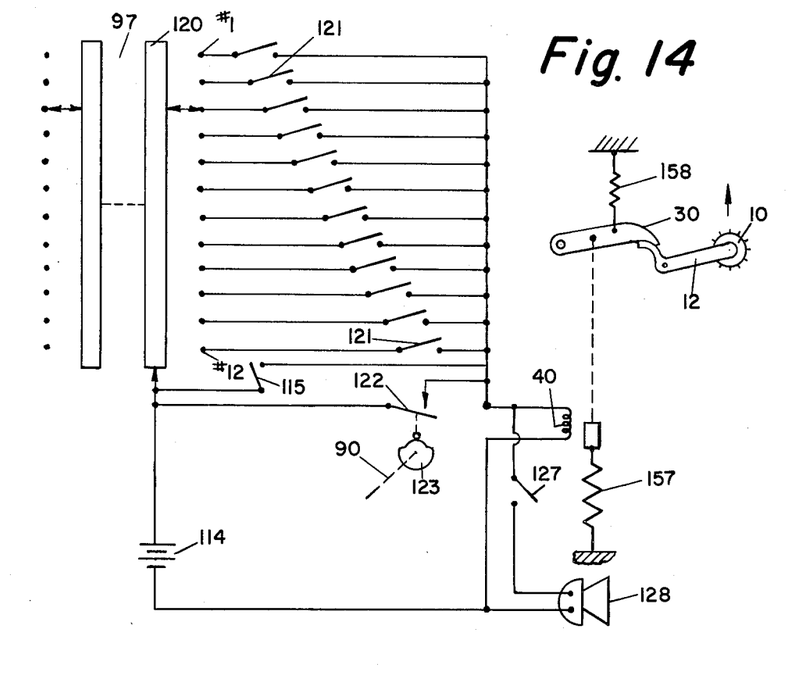
FIG. 14 diagrammatically illustrates print-holdout, print-on-demand and alarm circuitry associated with components of FIG. 13.

For the (b) type of operation, there is provided an additional multi-point switch 120 ganged to the point-selector switch 97 for operation in synchronism therewith (FIG. 14). Each point or fixed contact of switch 120 is in turn connected in series with the solenoid 40 and current source 114 through a switch or connector 121 which is in closed-circuit position if the corresponding measuring point is not in use or is not of immediate interest. Assuming, for example, it is desired to record the measurements taken at points #4 and #6, then all switches 121, or equivalent, would be closed except those connected to points #4 and #6 on the print-on-demand switch 120. For points #4 and #6, the solenoid 40 is deenergized and consequently the tilt-bar is released for movement to the position shown in FIG. 3 or FIG. 6 for printing.

For the (c) type of operation, the shaft 90 (FIGS. 13, 14) is associated with one or more limit switches 122 whose operating cams 123 may be preset to correspond with the upper and lower limits of the normal or safe range of the measured variable. Upon closure of any switch 122, the solenoid 40 is energized from source 114 to stop further printing: with switch 127 closed, the closure of limit switch 122 also results in energization of the alarm 128, such as a siren or bell to alert an operator. With the core of solenoid 40 biased by a strong spring 157 normally to hold the print arm 12 in the no-print position of FIG. 8 against the bias of the relatively weak spring 158 of the pawl 38, the recorder will commence to print only when the limit switch 122 is closed and, with switch 127 closed, an alarm is given each time the excessively high or low point is measured and recorded.

Figure 15:
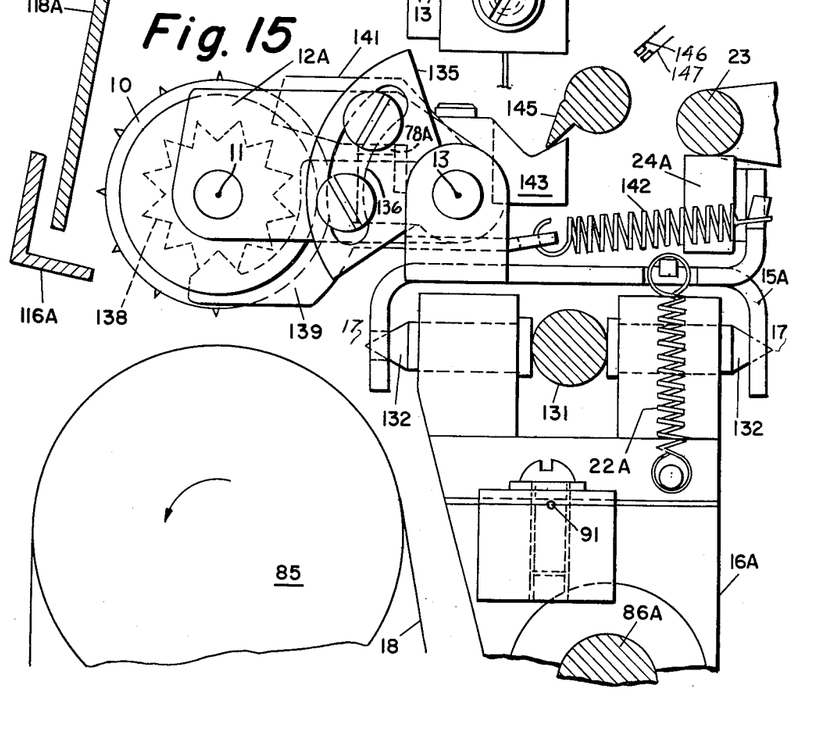
FIGS. 15 and 16 are side elevational and top plan views respectively of a modification of the recorder mechanism shown in preceding figures.
Figure 16:
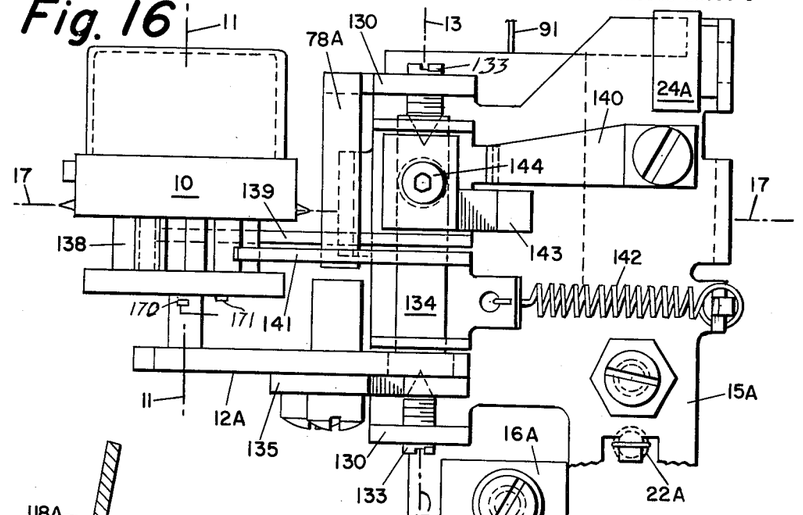
Figure 17:
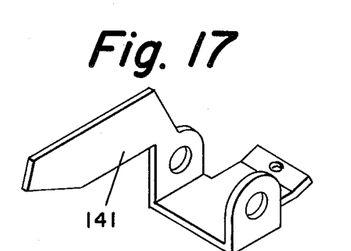
FIGS. 17 and 18 are perspective views of the two pawls shown in FIGS. 15 and 16.
Figure 18:
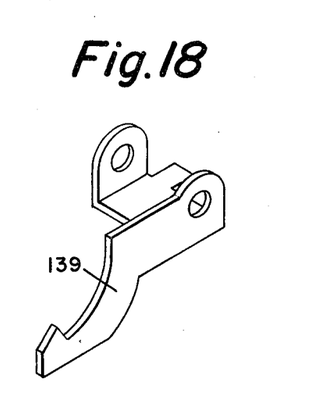

The recorder mechanism shown in FIGS. 15 to 18 is similar to that previously described in that the print wheel is carried by a print arm having a pivotal axis 13 parallel to the axis of rotation of the print wheel and that the print arm in turn is carried by a frame which is mounted on the recorder carriage for tilting movement about an axis 17 which is at right angles to the axis 13 and to the printing line. The elements of this modification are identified by the same reference characters as before plus a letter suffix to minimize repetition of preceding description applicable to both embodiments. A principal difference between the two embodiments is that in FIG. 15 et seq. the print wheel is not continuously rotated by a gear train but is stepped or advanced during the successive printing cycles. The print wheel of FIGS. 15, 16 is of the self-inking type and does not require an inking wheel such as wheel 65 of FIG. 11.

The carriage 16A (FIGS 15, 16) is guided for movement transversely of the chart 18 by a pair of bars 86A and 131, the latter engaged on opposite sides of its periphery by anti-friciton pads in the grooved upper face of the carriage. A pair of cone bearings 132 supports the frame member 15A on carriage 16A for pivotal movement about axis 17. The spring 22A biases the frame 15A for engagement of its anti-friction roller 24A with the tilt-bar 23. As in the earlier-described modification, the frame 15A may be tilted about axis 17 to either of two printing positions: one for printing of dots only and the other for printing of dots plus point-identification generally as described in connection with FIGS. 3 to 7.

The pair of cone bearings 133 threadedly received by the ears 130 extending upwardly from frame 15A supports the print arm shaft 134 for pivotal movement about the axis 13. The plate 135 attached to shaft 134 has an arcuate adjusting slot 136 through which a clamping screw extends for threaded engagement with the print arm 12A. The print wheel shaft 11 at the outer free end of the print arm is parallel to the print shaft 134. The print wheel 10 rotatably supported on shaft 11 is coupled to the concentric ratchet wheel 138. The lower pawl 139 (FIG. 18) is rotatably mounted on the print shaft 134 and is biased by the leaf spring 140 (FIG. 16) for engagement with the ratchet wheel 138. The upper pawl 141 also rotatably mounted on the print shaft 134 is biased by spring 142 to a stop limited position (see stop 78A) in the path of the ratchet wheel 138. The print-and-advance cam 143 is fastened as by set screw 144 to the print shaft 134 with its cam face in the path of rotation of the elongated one-toothed pinion or flipper bar 145 extending between the side frames (not shown) of the recorder and driven by a clock motor.

During each revolution of pinion 145, it engages cam 143 and rocks the print arm 12A in clockwise direction about axis 13 to effect disengagement of the ratchet wheel 138 from the lower pawl 139 and to effect one step of advance of the print wheel 10 about its axis 11 by engagement of the ratchet wheel 138 with the upper pawl 141. During this advance, the upper pawl 141 is also swung in clockwise direction about axis 13 to store energy in spring 142. During its continued rotation, the pinion 145 releases cam 143 whereupon the stored energy of spring 142 impels the arm 12A to move in counter-clockwise direction about axis 13. During this movement, the ratchet wheel 138 is re-engaged by the lower pawl 139 to lock the print wheel in its advanced position. Because of the inertia of the print arm and parts moving therewith, the print wheel arm over-travels its normal position (FIG. 15) to effect engagement of the print wheel with the chart. During this over-travel, energy is stored in the leaf spring 140 for return of the print arm 12A to its normal or neutral position after printing. Thus, the pawls 139, 141 and their biasing springs in addition to stepping the print wheel sequentially to present successive sets of markers to the chart also perform the same functions as the scissors arms 76A, 76B of the previously described embodiment.

The shaft of pinion 145 may be coupled, as in FIG. 13, to gear train associated with the timing cam 29 for tilt-bar 23 and also associated with the synchronizing switch 153. As an alternative for the latter, there may be used a stepping relay whose control switch is momentarily closed during each printing operation. Specifically, the normally-open contacts 146, 147 (FIG. 15) of such switch are momentarily closed for each revolution of the pinion 145 to energize the relay for stepping of the selector switch to its next measuring point.

To insure synchronism between print wheel 10 and point-selector switch 97, a second set of normally-open contacts 170, 171 (FIG. 16) may be used. These contacts will be momentarily closed once for each complete revolution of the print wheel 10. In series with these contacts, there is a set of normally closed contacts 172, 173 (FIG. 13), on point-selector switch 97 which are opened once per cycle of point-selector switch 97. One cycle of point-selector switch 97 is equal to one revolution of print wheel 10. Synchronism between print wheel 10 and switch 97 is defined as that condition where the normally closed contacts 172, 173 on switch 97 are open and the normally open contacts 170, 171 associated with print wheel 10 are closed. The motor coil 151 of the stepping relay is in series with the normally closed contacts of this relay, the normally open contacts associated with print wheel 10, and the timing switch 155. If the normally closed contacts 172, 173 on stepping relay 97 are not open when the normally open contacts 170, 171 associated with print wheel 10 are closed, the stepping relay coil 151 is energized and stepping relay advanced until synchronism is reestablished.

It shall be understood the invention is not limited to the specific embodiments described and illustrated but includes equivalents within the scope of the appended claims.

What is claimed is:

1. A multiple-point recorder comprising
   a carriage linearly movable with respect to the printing line of a recorder chart,
   a print wheel supported from said carriage for positioning of its axis of rotation both about a first pivotal axis and about a second pivotal axis, said print wheel having sets of markers angularly spaced about its periphery,
   continuously rotating cam means periodically rocking the axis of rotation of said print wheel about said first pivotal axis to provide for engagement of the print wheel with said printing line of the chart,
   means operative in synchronism with said cam means to rotate the print wheel about its axis of rotation to a new angular position in the interval between successive printings to present the sets of markers in succession to the chart, and
   means for tilting the axis of rotation of the print wheel about said second pivotal axis to determine which marker or markers of the sets thereof engage the chart.

2. A multiple-point recorder comprising
   a carriage linearly movable with respect to a recorder chart,
   structure mounted on said carriage for pivotal movement about a first axis,
   a print wheel having angularly spaced markers about its periphery and mounted on said structure with its axis of rotation parallel to said first axis,
   means for biasing said structure to a neutral position for which said print wheel is out of contact with the chart,
   continuously rotating cam means periodically rocking said structure about said first axis to move the print wheel farther from the chart for storage of energy in said biasing means and then releasing said structure for printing movement of the print wheel by said stored energy, and
   means operating in synchronism with said cam means to rotate the print wheel to a new angular position in the interval between successive printings.

3. A multiple-point recorder comprising
   a carriage linearly movable with respect to a recorder chart,
   inking pad means mounted on said carriage,
   structure mounted on said carriage for pivotal movement about a first axis,
   a print wheel having angularly spaced markers about its periphery and mounted on said structure with its axis of rotation parallel to said first axis,
   means for biasing said structure to a neutral position for which said print wheel is out of contact with said inking pad means and the chart,
   continuously rotating cam means periodically swinging said structure away from neutral position in direction for engagement between the inking pad means and the print wheel and for storage of energy in said biasing means and then releasing said structure for movement of said structure in the reverse direction and beyond neutral position by said stored energy for printing engagement between the print wheel and the chart, and
   means operating in synchronism with said cam means to rotate the print wheel to a new angular postion in the interval between successive printing engagements.

4. A multiple-point recorder comprising
an elongated pinion continuously rotating about an axis parallel to a recorder chart,
a carriage movable parallel to said pinion,
structure mounted on said carriage for movement about a pivotal axis,
a print wheel having markers angularly spaced about its periphery and rotatably mounted on said structure,
means for rotating said print wheel comprising a gear train including gears mounted on said structure and including a gear in continuous mesh with said pinion for all positions of said carriage, and
cam means mounted on said carriage and driven from said gear periodically to rock said structure about said pivotal axis for effecting engagement of the print wheel with said chart.

5. A multiple-point recorder comprising
an elongated pinion continuously rotating about an axis parallel to the recorder chart,
a carriage movable parallel to said pinion,
structure mounted on said carriage for movement about a pivotal axis,
a print wheel having markers angularly spaced about its periphery and rotatably mounted on said structure,
means for biasing said structure to a neutral position for which said print wheel is out of contact with the chart,
means for rotating said print wheel comprising a gear train including gears mounted on said pivoted structure and including a gear in continuous mesh with said pinion for all positions of said carriage, and
cam means mounted on said carriage and driven from said gear periodically to swing said pivoted structure farther from the chart for storage of energy in said biasing means and then releasing said structure for movement in reverse direction and beyond neutral position by said stored energy for printing engagement between the print wheel and the chart,
the number of gears in said train so phasing the differential-gear action incident to pivotal movement of said structure that rotation of the print wheel is momentarily suspended for printing.

6. A multiple-point recorder as in claim 5 in which back-lash in the gear train is sufficient to interrupt the drive of the print wheel during the pivotal movement of said structure in said reverse direction, and which additionally includes means effective upon release of said structure from the cam means for movement in said reverse direction frictionally to hold the print wheel at rest until, after printing, the gear drive to the print wheel is resumed by take-up of the back-lash.

7. A multiple-point recorder comprising
an elongated pinion continuously rotating about an axis parallel to the recorder chart,
a carriage movable parallel to said pinion,
inking pad means mounted on said carriage,
structure mounted on said carriage for movement about a pivotal axis,
a print wheel having markers angularly spaced about its periphery and rotatably mounted on said structure,
means for biasing said structure to a neutral position for which said print wheel is out of engagement both with said inking pad means and the chart,
means for normally rotating said print wheel at constant speed comprising a gear train including gears mounted on said pivoted structure and including a gear in continuous mesh with said pinion for all positions of said carriage,
cam means mounted on said carriage and driven from said gear periodically to swing said pivoted structure in direction to effect engagement of the print wheel with said inking pad means and to store energy in said biasing means and then releasing said structure for movement in reverse direction and beyond neutral position by said stored energy for printing engagement between the print wheel and the chart,
the number of gears in said train so phasing the differential-gear action incident to pivotal movement of said structure by said cam means that the rotation of the print wheel due to such action is additive to that due to gear drive when said pivoted structure is swung in direction to effect inking of the print wheel, and said gear train having sufficient back-lash to interrupt the gear drive to the print wheel during movement of said structure in reverse direction by the stored energy of said biasing means, and
means effective upon release of said structure from the cam means for frictionally holding the print wheel at rest until, after printing, the gear drive to the print wheel is resumed by take-up of the back-lash.

8. A multiple-point recorder comprising
a carriage linearly movable with respect to a recorder chart and having a pointer for indicating the magnitude of a measured variable,
structure mounted on said carriage for movement about a pivotal axis,
a print wheel having angularly-spaced markers about its periphery and rotatably mounted on said structure,
means for biasing said structure to a neutral position for which said print wheel is out of contact with the chart,
continuously rotating cam means periodically rocking said structure about its said pivotal axis to move the print wheel farther from the chart for storage of energy in said biasing and then releasing said structure normally to effect by said stored energy movement of the print wheel into engagement with the chart,
means operating in synchronized relations to the cam means to rotate the print wheel to a new angular position in the interval between successive rocking movements of said structure by the cam means, and
selector means for holding said structure in an angular position about its said pivotal axis for which it is not engaged by said periodically-operated cam means to interrupt recording of the variable during continued indication of instantanous values thereof.

9. A multiple-point recorder comprising
a carriage linearly movable with respect to a recorder chart,
a rotatable print wheel supported from said carriage for positioning of its axis of rotation both about a first pivotal axis and about a second pivotal axis at right angles to said first pivotal axis,
said print wheel having sets of markers equally angularly spaced about a peripheral face, each set of markers comprising a dot-marker and an identification marker,
means for positioning the axis of rotation of the print wheel about said second pivotal axis either to a first angular position for which said peripheral face is inclined with respect to the chart for printing of dots alone or to a second angular position for which said peripheral face is parallel to the chart for printing of both dots and point identification, and
means synchronized with rotation of the print wheel about its axis for rocking that axis about said first pivotal axis to effect engagement of the print wheel while in either of said angular positions with respect to the chart.

10. A multiple-point recorder as in claim 9 which additionally includes selector means associated with said positioning means for continuously maintaining the axis of the print wheel in either of said angular positions.

11. A multiple-point recorder as in claim 9 which additionally includes means for biasing the axis of rotation of the print wheel to said first angular position, and a second synchronized means effecting movement of said axis of rotation of the print wheel to said second angular position at intervals corresponding with an integral number of revolutions of the print wheel plus or minus the spacing between sets of markers.

12. A multiple-point recorder as in claim 9 additionally including selector means for displacing the axis of rotation of the print wheel to a position for which said synchronizing means is incapable of rocking it about said first pivotal axis for printing.

13. A multiple-point recorder comprising
a carriage linearly movable with respect to a recorder chart,
a frame pivotally mounted on said carriage for movement about a first pivotal axis,
structure pivotally mounted on said frame for movement about a second pivotal axis,
a print wheel rotatably carried by said structure,
said print wheel having sets of markers equally angularly spaced about a peripheral face, each set of markers comprising a dot marker and a point-identification marker,
a first means operated in synchronism with presentation of successive markers toward the chart to rock said structure about said second axis normally to effect printing engagement between the chart and said print wheel, and
a second means controlling the angular position of said frame about said first axis to determine whether the print wheel prints only a dot or a dot plus its point-identification.

14. A multi-point recorder as in claim 13 additionally including means for effecting movement of said structure about said second pivotal axis to a position for which said first means is ineffective to cause printing engagement between the chart and the print wheel.

15. A multi-point recorder as in claim 13 in which said second means includes means operating at periodic intervals I corresponding with $$I = M\,360° \pm N\frac{360°}{\theta}$$

where $M$ = any integer
$\theta$ = number of equally spaced marker sets
$N$ = any prime integer for shifting the angular position of the frame after printing of a series of dots to a different angular position for which a point-identification is also printed and then shifting the frame back to its original angular position for resumption of printing of dots only.

16. A multi-point recorder comprising
a carriage linearly movable with respect to a recorder chart,
a tilt-bar extending parallel to the path of the carriage,
a frame pivotally mounted on said carriage for movement about a first pivotal axis normal to the path of the carriage and having stop means engaging said tilt-bar,
a first biasing means for said frame normally maintaining said stop means in engagement with said tilt-bar,
structure pivotally mounted on said frame for movement about a second pivotal axis,
a print wheel rotatably carried by said structure,
said print wheel having sets of markers equally angularly spaced about a peripheral face, each set of markers comprising a dot marker and a point-identification marker,
said dot markers alone being successively presented toward the chart for a first angular position of the frame about said first pivotal axis and the point-identification markers being additionally successively presented toward the chart for a second angular position of the frame,
a second biasing means normally maintaining said structure in a neutral position for which said print wheel is out of contact with the chart,
a continuously rotating cam periodically moving said structure about said second pivotal axis away from its neutral position in direction to move the print wheel farther from the chart and to store energy in said second biasing means and then releasing said structure for movement in reverse direction by the stored energy so to effect printing engagement of the print wheel with the chart for either angular position of said frame and at intervals corresponding with the marker spacing, and
means synchronized with rotation of the print wheel for positioning said tilt-bar alternately to dispose said frame in its first angular position for an interval corresponding with printing with a series of dots and then in its second angular position for additionally printing one of the point-identifications.

17. A multi-point recorder as in claim 16 additionally including
an elongated pinion continuously rotating about an axis parallel to the path of the carriage, and
means for rotating the print wheel and the cam comprising a gear train including a gear in continuous mesh with said pinion and gears on said pivotally mounted structure,
the number of gears in said train so phasing the differential-gear action incident to pivotal movement of said structure that rotation of the print wheel is momentarily interrupted for printing.

18. A multiple-point recorder as in claim 17 in which the gear train has sufficient back-lash to interrupt the drive of the print wheel throughout the pivotal movement of said structure in reverse direction, and which additionally includes means effective upon release of said structure from the cam frictionally to hold the print wheel at rest until, after printing, the gear drive to the print wheel is resumed by take-up of the back-lash.

19. A multiple-point recorder system comprising
a carriage linearly movable with respect to a recorder chart,
structure mounted on said carriage for movement about a pivotal axis,
a print wheel having markers angularly spaced about its periphery and rotatably mounted on said structure,
continuously rotating cam means periodically rocking said structure about said pivotal axis to provide for engagement of the print wheel with said chart,
means operative in synchronism with said cam means to rotate the print wheel about its axis to a new angular position in the interval between successive printings,
a multi-point synchronizing switch operating in synchronism with the means which rotates the print wheel,
a stepping relay means including a motor coil, a multi-point control switch, and a multi-point selector switch,
a synchronizing circuit including said synchronizing switch, said control switch and said relay coil, and a timing switch periodically closed in advance of the rocking of said structure by said cam means, and
a self-balancing measuring circuit having a motor effective during rebalancing of the measuring circuit to move said carriage to a corresponding position, said multi-point selector switch as stepped by said relay means in turn including in said measuring circuit transducers whose outputs are recorded by engagement of successive markers of the print wheel with the recorder shaft.

20. A multiple-point recorder system comprising
a carriage movable transversely of a recorder chart to positions corresponding with the balance of a measuring circuit,
a print wheel having markers angularly spaced about its periphery and mounted on said carriage both for rotation of the print wheel about its own axis and for rocking of its axis toward and from the chart for printing by the marker presented thereto,
means operated periodically to rotate said print wheel to present the markers in turn to the chart and to rock the axis of the print wheel in the intervening intervals,
a multi-point synchronizing switch operating in synchronism with said means and having one open-circuit position which advances in correspondence with the markers,
a stepping-relay means including a motor coil, a multi-point control switch having one closed-circuit position which advances with stepping of the relay, and a multi-point selector switch having one closed-circuit position which advances with stepping of the relay,
a synchronizing circuit including said synchronizing switch, said control switch, and a timing switch periodically closed in advance of the rocking of the print wheel axis, and
a self-balancing measuring circuit having a motor effective during rebalancing of the circuit to move said carriage, said multi-point selector switch as stepped by said relay means in turn including in said measuring circuit the transducer corresponding with the open-circuit position of said synchronizing switch.

References Cited by the Examiner
UNITED STATES PATENTS

| | | | |
|---|---|---|---|
| 651,856 | 6/00 | Hill | 346—50 |
| 2,125,345 | 8/38 | Hunt | 346—46 |
| 2,191,673 | 2/40 | Moore | 346—46 |
| 2,328,664 | 9/43 | Moore | 346—46 |
| 2,392,916 | 1/46 | Gruss | 346—32 |
| 2,421,834 | 6/47 | Crowther | 346—17 |
| 2,428,129 | 9/47 | Smith | 346—34 |
| 2,525,094 | 10/50 | Caldwell | 346—33 |
| 2,542,475 | 2/51 | Caldwell | 346—106 |
| 2,628,149 | 2/53 | Blakeslee | 346—32 |
| 2,761,068 | 8/56 | Geisler | 250—51.5 |
| 2,899,258 | 8/59 | Spracklen | 346—34 |
| 3,034,125 | 5/62 | Gonzenbach | 346—79 |

References Cited by the Applicant
UNITED STATES PATENTS

| | | |
|---|---|---|
| 2,082,591 | 6/37 | Newman. |
| 2,113,069 | 4/38 | Ross et al. |
| 2,113,748 | 4/38 | Ross et al. |
| 2,549,401 | 4/51 | Stein et al. |
| 2,637,619 | 5/53 | Stein. |
| 2,657,376 | 10/53 | McAdam. |
| 2,673,136 | 3/54 | Stein et al. |
| 2,808,549 | 10/57 | Vandeventer. |

LEO SMILOW, *Primary Examiner.*

UNITED STATES PATENT OFFICE
CERTIFICATE OF CORRECTION

Patent No. 3,195,141                                              July 13, 1965

Robert N. Brown et al.

It is hereby certified that error appears in the above numbered patent requiring correction and that the said Letters Patent should read as corrected below.

Column 2, line 17, for "relationsihp" read -- relationship --; column 7, line 62, for "circutry" read -- circuitry --; column 9, line 48, before "gear" insert -- a --; column 12, line 35, after "biasing" insert -- means --; line 39, for "relations" read -- relation --.

Signed and sealed this 28th day of June 1966.

EAL)
test:

RNEST W. SWIDER                                    EDWARD J. BRENNER
testing Officer                                            Commissioner of Patents